United States Patent [19]
Matzke et al.

[11] Patent Number: 5,838,908
[45] Date of Patent: Nov. 17, 1998

[54] DEVICE FOR HAVING PROCESSORS EACH HAVING INTERFACE FOR TRANSFERRING DELIVERY UNITS SPECIFYING DIRECTION AND DISTANCE AND OPERABLE TO EMULATE PLURALITY OF FIELD PROGRAMMABLE GATE ARRAYS

[75] Inventors: Douglas J. Matzke, Plano; Donald E. Steiss, Richardson, both of Tex.

[73] Assignee: Texas Instruments Incorporated, Dallas, Tex.

[21] Appl. No.: 910,802

[22] Filed: Aug. 13, 1997

Related U.S. Application Data

[63] Continuation of Ser. No. 338,936, Nov. 14, 1994, abandoned.

[51] Int. Cl.⁶ .................................................. G06F 13/00
[52] U.S. Cl. .................................. 395/200.6; 395/200.31; 395/500; 395/800.17
[58] Field of Search ............................. 395/500, 200.31, 395/200.6, 800.17

[56] References Cited

U.S. PATENT DOCUMENTS

| | | | |
|---|---|---|---|
| 3,287,703 | 11/1966 | Slotnick | 395/800 |
| 4,251,861 | 2/1981 | Mago | 395/800 |
| 4,306,682 | 12/1981 | Cocke et al. | 395/800 |
| 4,587,625 | 5/1986 | Marino et al. | 364/578 |
| 4,644,496 | 2/1987 | Andrews | 395/800 |
| 4,656,580 | 4/1987 | Hitchcock, Sr. et al. | 395/500 |
| 4,809,202 | 2/1989 | Wolfram | 364/578 |
| 4,819,150 | 4/1989 | Jennings et al. | 395/500 |
| 4,866,663 | 9/1989 | Grifgfin | 395/500 |
| 4,873,656 | 10/1989 | Catlin | 364/578 |
| 4,933,895 | 6/1990 | Grinberg et al. | 364/748 |
| 4,943,909 | 7/1990 | Huang | 395/800 |
| 5,093,920 | 3/1992 | Agrawal et al. | 395/800 |
| 5,115,502 | 5/1992 | Tallman | 395/500 |
| 5,159,690 | 10/1992 | Margolus et al. | 395/800 |
| 5,257,266 | 10/1993 | Maki | 395/182.02 |
| 5,287,345 | 2/1994 | Osmon et al. | 370/60 |
| 5,551,013 | 8/1996 | Beausoleil et al. | 395/500 |

OTHER PUBLICATIONS

Universal Wormhole Routing, Ronald I. Greenberg and H.–C. Oh, Proceedings fo the Fifth IEEE Symposium on Parallel and Distributed Processing, pp. 56–63, Dec. 1–4, 1993.

K. Suzuki et al, A 500 Mhz, 32 bit, .4 um CMOS RISC Processor LSI, Solid State Circuits, 41st Conference, pp. 214–215, Feb. '94.

*Primary Examiner*—Thomas C. Lee
*Assistant Examiner*—Anderson I. Chen
*Attorney, Agent, or Firm*—Robert D. Marshall, Jr.; James C. Kesterson; Richard L. Donaldson

[57] ABSTRACT

A virtual field programmable gate array device (20) includes a plurality of processors (22), each containing a central processing unit (24), memory (34), and a network interface (26). Each processor (22) may be programmed to emulate a multiple number of gates of a conventional field programmable gate array device. Each processor (22) is part of a network array to allow for information transfer between and among each processor (22). Information transfer is accomplished through the use of delivery units (50) that identify the routing vector for the information to an appropriate processor (22).

13 Claims, 6 Drawing Sheets

BIT 7 = 1 DELIVER TO NEXT NETWORK NODE
    BITS 2-0 = > STEP COUNT RANGE 1-8
    BITS 6-3 = > DIRECTION
        1000 GLOBAL BROADCAST    0000 PROG DIRECTION 0
        1001 DIRECTION 1-NORTH    0001 PROG DIRECTION 1
        1010 DIRECTION 2-SOUTH    0010 PROG DIRECTION 2
        1011 DIRECTION 3-EAST     0011 PROG DIRECTION 3
        1100 DIRECTION 4-WEST     0100 PROG DIRECTION 4
        1101 DIRECTION 5-UP       0101 PROG DIRECTION 5
        1110 DIRECTION 6-DOWN     0110 PROG DIRECTION 6
        1111 NULL DIRECTION        0111 PATH ASSIGNMENT

BIT 7 = 0    DELIVER TO THIS NODE
BIT 6 = 1    DELIVER TO THIS NODE'S MEMORY
          BITS 5-0 = > WORD COUNT (1-64)
BITS 6 = 0   DELIVER TO THIS NODE'S REGISTERS
          BITS 5-4 REGISTER SELECTION
          00 = > TO NETWORK REGISTER
          01 = > TO SET 1 I/O PAD REGISTERS
          10 = > TO SET 2 I/O PAD REGISTERS
          11 = > TO SET 3 I/O PAD REGISTERS
              BITS 3-0 I/O PAD CONTROL WORDS
              PIN DIRECTIONS/TRANSPARENT
              PIN DELIVERY WORD
              SEND PINS DATA SAMPLE
              RECURRENT DELIVERY TIME PERIOD

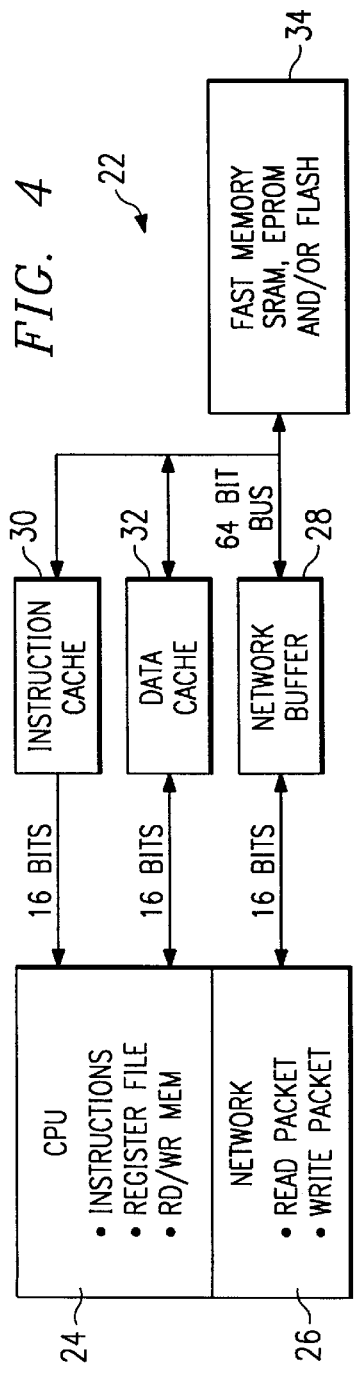

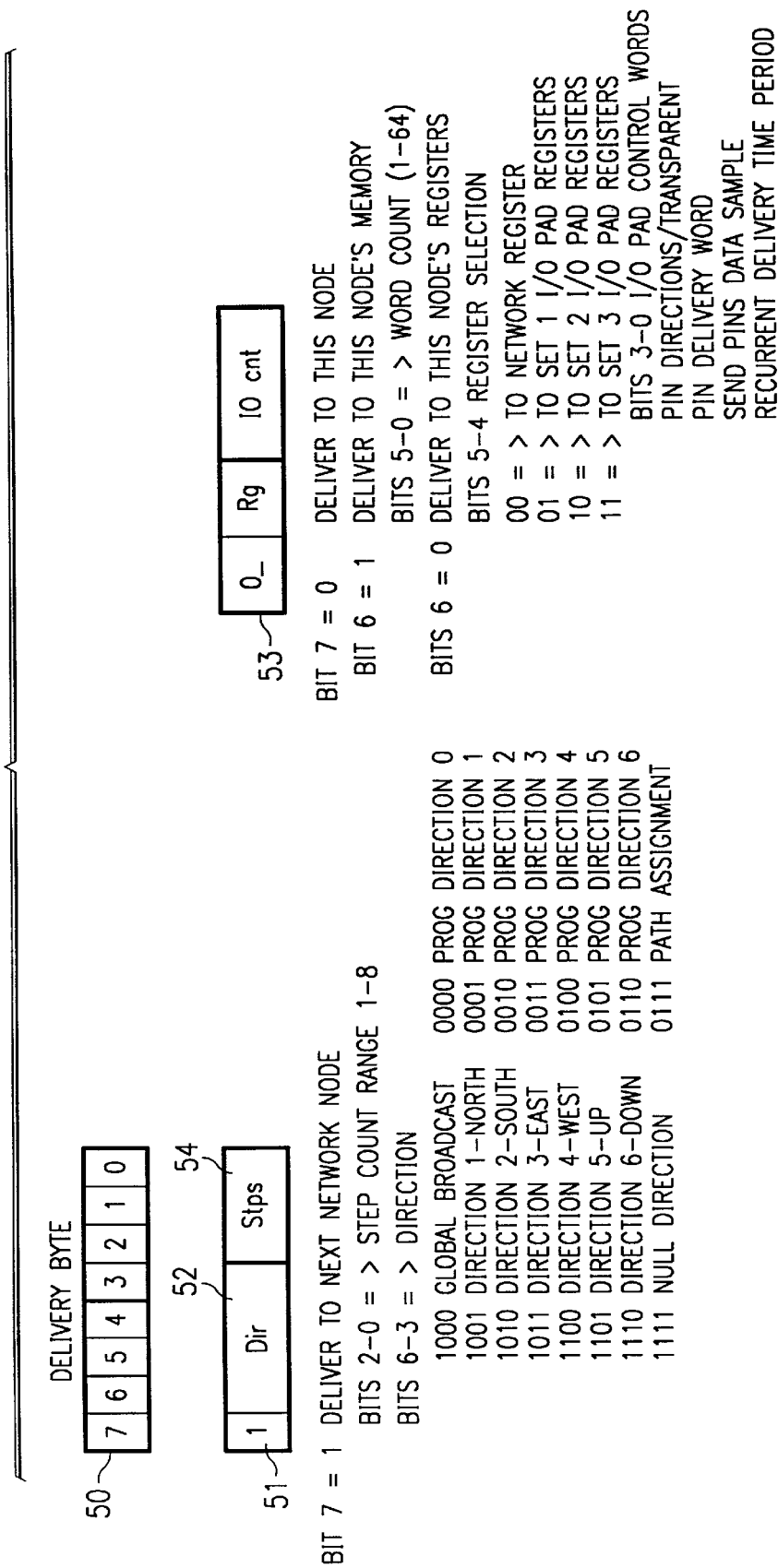

ome
DEVICE FOR HAVING PROCESSORS EACH HAVING INTERFACE FOR TRANSFERRING DELIVERY UNITS SPECIFYING DIRECTION AND DISTANCE AND OPERABLE TO EMULATE PLURALITY OF FIELD PROGRAMMABLE GATE ARRAYS This application is a division of application Ser. No. 08/338,936, filed Nov. 14, 1994, now abandoned.

TECHNICAL FIELD OF THE INVENTION

The present invention relates in general to cellular computing devices and more particularly to a virtual field programmable gate array device.

BACKGROUND OF THE INVENTION

Cellular computation can be generally viewed as any computation that is spatially distributed in an array of cells, where each cell has a behavior based on its current state and interaction with its local neighboring cells. Each cell must have computing resources to maintain state and to behaviorially change that state based on its local interactions. Those computing resources eventually require silicon die area both for memory and logic to implement the state and behavior for the cell. Cellular systems are scalable in that they are modular and can grow to any size but they allow only local physical interconnection between cells.

Silicon cost is an important aspect in making cellular computing systems commercially viable. Compiler support for valuable applications and market acceptance are other important aspects for finding a market for cellular computing systems. Products that may be classified as cellular systems include massively parallel processor (MPP) super computers, field programmable gate array (FPGA) chips/systems, and cellular automata machines (CAM). These systems are cellular in that they are scalable in the number of elements that can be assembled into a system to work on the same problem. These products all emphasize high performance modular computing but they have their own definition of grain size and local neighborhood topology concerns which are not truly cellular.

Each of these product areas has a programming environment for parallel programs, but each takes a different approach. The MPP system takes the most general software approach, whereas the FPGA systems are programmed using hardware logic schematics and CAM systems use tables with transition rules. A drawback in these products is that they do not have the same concerns about scalability. The MPP and CAM systems are more concerned about system size scalability, or up scalability, and FPGAs tend to be more concerned about fabrication size scalability or down scalability. Up scalability and down scalability are inseparable when the cellular approach is applied to the highest performance and lowest cost system. Flexibility is lost through fixing the cell grain size and the physical architecture. Therefore, it is desirable to have a device that takes a truly cellular approach to high performance due to up scalability and down scalability efficiencies and through virtualization of cell grain size.

SUMMARY OF THE INVENTION

From the foregoing, it may be appreciated that a need has arisen for a device that provides efficient scalability and cell size virtualization. A need has also arisen for a device with increased flexibility and enhanced silicon utilization by allowing the same silicon die area to represent a much greater computing capacity. Further, a need has arisen for a device that implements a medium grain approach to bridge the gap between cellular automata machines and field programmable gate array devices for improvements in speed, size, and cost.

In accordance with the present invention, a virtual field programmable gate array device is provided that substantially eliminates or reduces disadvantages and problems associated with conventional cellular computing systems.

According to an embodiment of the present invention, there is provided a virtual field programmable gate array device that includes a plurality of processors operable to communicate within a network array. Each processor emulates a plurality of logic gates to perform the function of a plurality of field programmable gate arrays.

The present invention provides various technical advantages over conventional cellular computing systems. For example, one technical advantage is in reproducing the same logic behavior as a conventional field programmable gate array through the use of software emulation. Another technical advantage is in reducing silicon costs by time sharing the dedicated update logic. Another technical advantage is in providing a device that operates very high performance medium grain applications without the need for dedicated hardware architectures. Another technical advantage is that the memory for the virtual field programmable gate array device is not precast for specific usage requirements. Another technical advantage is in having a medium grain size device to allow for power down conservation during periods of inactivity. Another technical advantage is in implementing a scalable network through delivery unit communications. Another technical advantage is in the ability to represent more logic gates at a lower frequency than conventional field programmable gate arrays. Another technical advantage is in providing a more efficient device for certain applications, including digital signal processing applications. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 4 illustrates a block diagram of a processor within the virtual field programmable gate array device;

FIG. 5 illustrates a block diagram of the instruction word design for the virtual field programmable gate array device;

FIG. 9 illustrates a block diagram of a delivery unit for the network data structures;

DETAILED DESCRIPTION OF THE INVENTION

Figure 1:
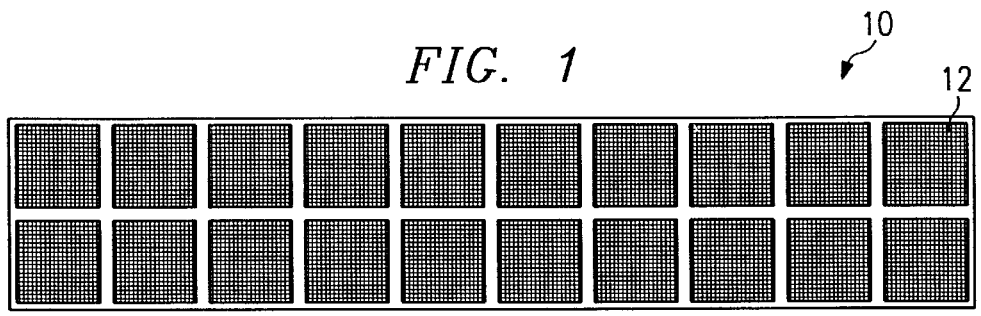
FIG. 1 illustrates a block diagram of a conventional field programmable gate array architecture.

FIG. 1 is a block diagram of a conventional field programmable gate array architecture 10. For discussion purposes, field programmable gate array architecture 10 is divided into a plurality of zones 12. Each zone 12 includes approximately 500 logic gates and though virtually connected, each zone is shown physically separated for clarity of discussion. For an antifuse type device, these logic gates are located within a plurality of modules wherein a zone 12 may be a 9×9 grid having eighty-one modules. For static random access memory based designs, the logic gates are located within a plurality of CLBs wherein a zone 12 may be made of a 4×5 CLB grid array to have approximately twenty CLBs. A typical antifuse chip will have 8,000 gates within 1,344 modules with a 50% memory area. For a conventional static random access memory base design, 8,000 gates may be implemented within 324 CLBs having a 30% memory area. Of these conventional architectures, the antifuse design is not reconfigurable and the static random access memory based design has a low memory to logic ratio and a larger die area.

Figure 2:
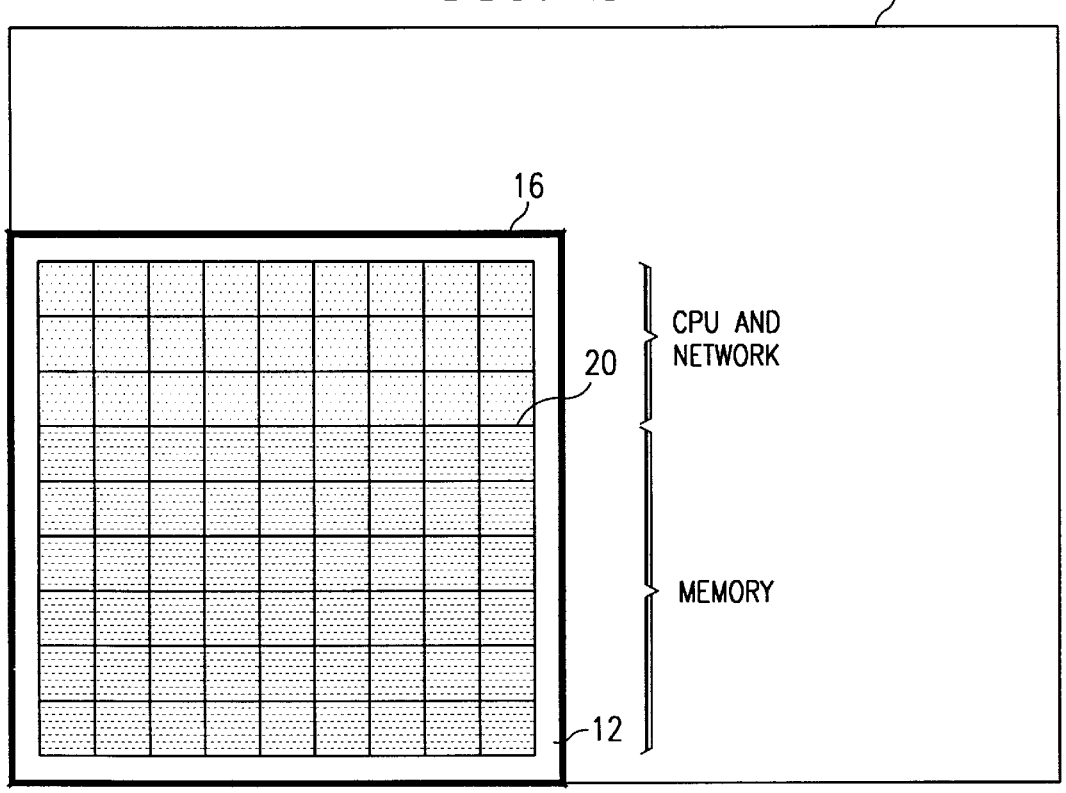
FIG. 2 illustrates a block diagram of a virtual field programmable gate array device as compared to conventional approaches.

FIG. 2 shows a block diagram of a die comparison between an antifuse type device and a static random access memory based design. An antifuse type design 16 has two and a half to three times less die area than a static random access memory base design 18. A virtual field programmable gate array device 20 can be implemented within the die size of a conventional antifuse device 16 with an increased memory to logic ratio and including the reconfigurable nature of the static random access memory base design 18.

Figure 3:
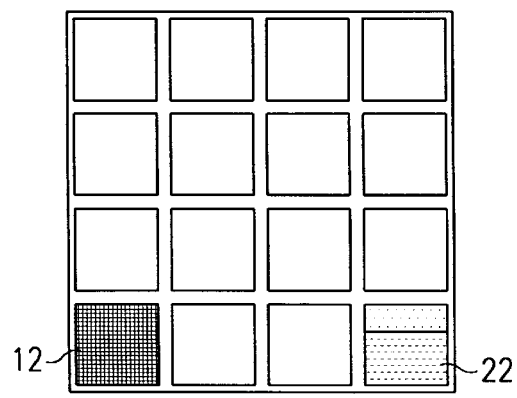
FIG. 3 illustrates a block diagram of the virtual field programmable gate array architecture.

FIG. 3 is a block diagram of an implementation of a virtual field programmable gate array device 20. Virtual field programmable gate array device 20 includes a plurality of processors 22 formed into a 4×4 network array. Each processor 22 may be programmed to emulate a zone 12 of the field programmable gate array architecture 10. Each processor has approximately 75% memory and 25% logic. Each processor 22 can represent from 500 to 2,000 gates using tables and vectorization in order to emulate a field programmable gate array device. The sixteen processors of the 4×4 network array can represent at least 8,000 gates within the approximate die size of a conventional antifuse type device 16. Though shown with sixteen processors 22, virtual field programmable gate array device 20 may implement any number of processors 22 as desired by the designer. By changing the number of processors, the size of the emulated field programmable gate area is impacted without changing the performance. Also, increasing the amount of memory per processor increases the size of the emulation but not the speed, resulting in a lower cost solution that is slower.

FIG. 4 shows a block diagram for each processor 22. Each processor 22 includes a central processing unit 24, a network interface 26, a network buffer 28, an instruction cache 30, a data cache 32, and a memory 34. Processor 22 uses a sixteen bit network bus to receive and transfer information within the network array. Processor 22 is preferably a 500 MHz sixteen bit minimal instruction set computer (MISC CPU). Processor 22 may be implemented to emulate 500 gates using 214 4K bytes of memory and 4K gates of logic and have the same density as antifuse type design 16 with a two and a half to three times smaller density than a static random access memory type design 18. Processor 22 may also be configured to emulate 2,000 gates, thus having the ability to provide four times the capability of conventional approaches within the same die area. Memory 34 may be static random access memory, electrically programmable read only memory, or any combination thereof.

Virtual field programmable gate array device 20 uses sequential software to implement logic equations, thus putting software and hardware algorithms on an equal footing. Virtual field programmable gate array device 20 is limited only by the programming environment and its memory size. Since traditional field programmable gate array cells are relatively large, each tiny processor 22 can be built in at most the same area as the region needed to program 500 gates in an antifuse type array device that would be emulated.

Virtual field programmable gate array device 20 can also operate faster than a conventional field programmable gate array device, depending upon the application. In a conventional field programmable gate array device, each cell is relatively large and contains lots of capacitance on the programmable interconnect wires. Asynchronous delays on the order of eight to ten nanoseconds can occur through these conventional cells. By contrast, virtual field programmable gate array device 20 is a tightly packed, custom layout, synchronous, pipelined CPU design that completes an instruction every two nanoseconds, resulting in a four to five times faster basic delay. Further, vectorized data path operations, random logic implemented as lookup tables, and the use of high level behavioral primitives allow a very dense representation consisting of many gates per CPU instruction and a fast emulation of gates per clock. Optimizing the CPU instruction set for digital signal processing applications or RTL simulation could also enable additional density and performance improvement.

The following example illustrates the density and performance achieved by virtual field programmable gate array device 20. In a conventional field programmable gate array device, a sixteen bit adder may represent 200 to 400 gates and take three to five cell delays for a total of twenty-four to fifty nanoseconds delay. Virtual field programmable gate array device 20 could emulate this sixteen bit adder in two to four instructions, depending on whether the inputs come from registers or memory, resulting in worst case time delay of eight nanoseconds. Therefore, three to six sixteen bit adders could be emulated in the same time that a single adder would be implemented in a conventional field programmable gate array device. Further, the adders emulated in a virtual field programmable gate array device 20 would represent significantly more gates than in the conventional field programmable gate array device. Increased speed and performance also occurs through implementation of fixed point processing and not floating point processing.

FIG. 5 shows an example of the instruction word design for a virtual field programmable gate array device 20. The instructions for virtual field programmable gate array device 20 are preferably based on the "C" language. The "C" language allows for code generation to perform logic emulation as well as handwritten algorithms for digital signal processors or systolic applications. Conventional field programmable gate array designs are partitioned and code generated into small programs in order to operate within CPU 24 of virtual field programmable gate array device 20. Sixteen bit instruction words are used for compatibility with the sixteen bit network of virtual field programmable gate array device 20. The instruction words may have three operands or two operands depending on the intended operation. In the example shown, thirty-two instructions may be implemented by CPU 24. Though a specific instruction set is shown, virtual field programmable gate array device 20 may implement any type of instruction set for performing a desired application.

Figure 6:
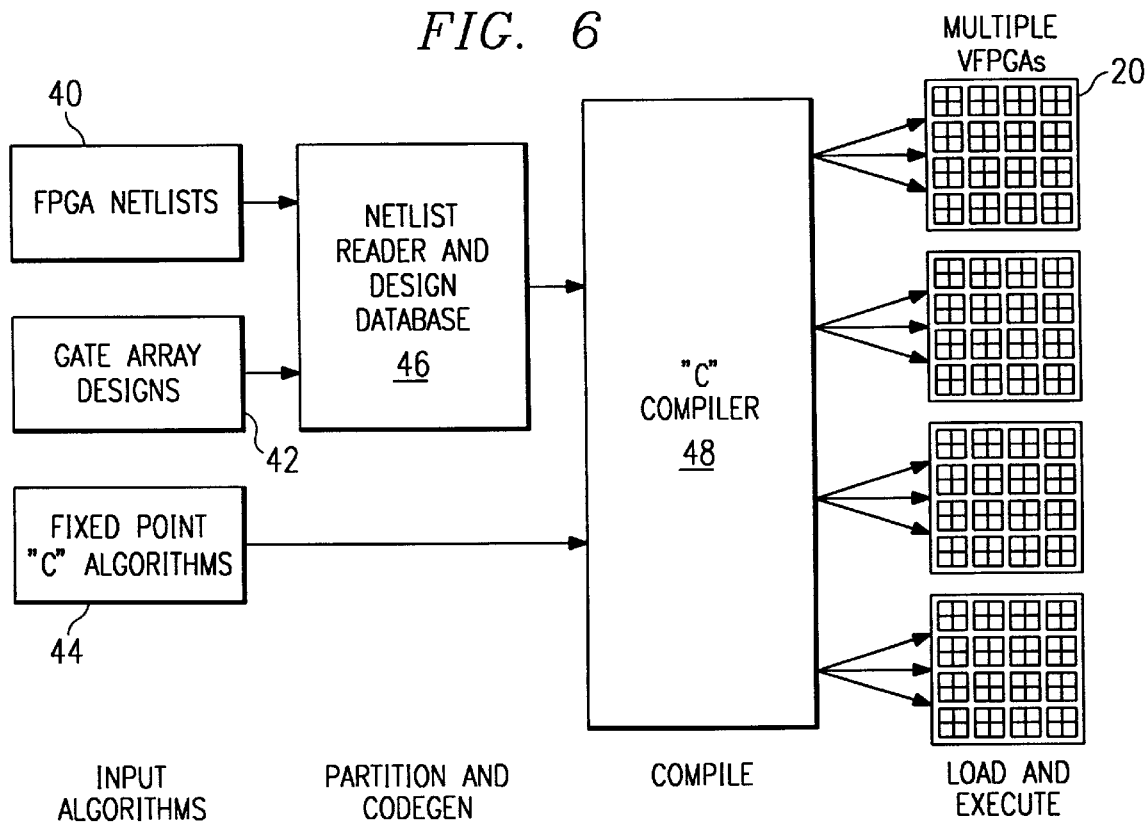
FIG. 6 illustrates a block diagram of the software flow to the virtual field programmable gate array devices.

FIG. 6 shows the software flow to virtual field programmable gate array device 20. Input algorithms may be generated by FPGA netlists 40, gate array designs 42, and fixed point "C" algorithms 44. Algorithms from FPGA netlists 40 and gate array designs 42 are partitioned and code generated by netlist reader 46. The partitioned and code generated FPGA netlists 40 and gate array designs 42, as well as the fixed point "C" algorithms 44, are cross-compiled by a "C" compiler 48 into the instruction set for virtual field programmable gate array device 20. The compiled instruction set is transferred to appropriate processors 22 within virtual field programmable gate array device 20 for program and data load, into CPU 24 and memory 34 for the appropriate processors 22, providing for subsequent execution of the instruction set by virtual field programmable gate array device 20. Conventional field programmable gate arrays require elaborate place and route software for one time device programming.

Figure 7:
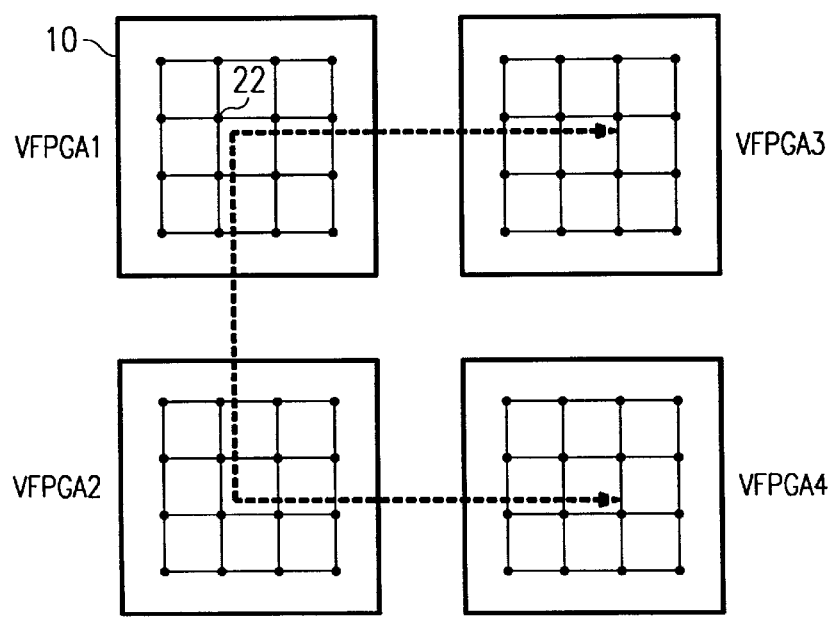
FIG. 7 illustrates a block diagram of information transfer within and between virtual field programmable gate array devices.

An important part of virtual field programmable gate array device 20 is the network connecting the processors together on the chip as well as connecting multiple chips together to allow for program and data transfer. FIG. 7 shows a block diagram of multiple virtual field programmable gate array devices 20 and multiple processors 22 within each virtual field programmable gate array device 20. Each processor 22 represents a network node of the network array. Each processor 22 physically interacts only with its immediate neighboring processor in order to minimize clock skew differences. In order to be tolerant of clock skew problems, the on-chip network for virtual field programmable gate array device 20 is of a true cellular design. The on-chip network is simple and relies on compile time scheduling for conflict resolution, similar to that of conventional field programmable gate arrays. Therefore, no extra collision hardware or software is required in each processor 22. The network between chips may either look like a conventional field programmable gate array device or look more like a general network of virtual wires or virtual buses.

Figure 8:
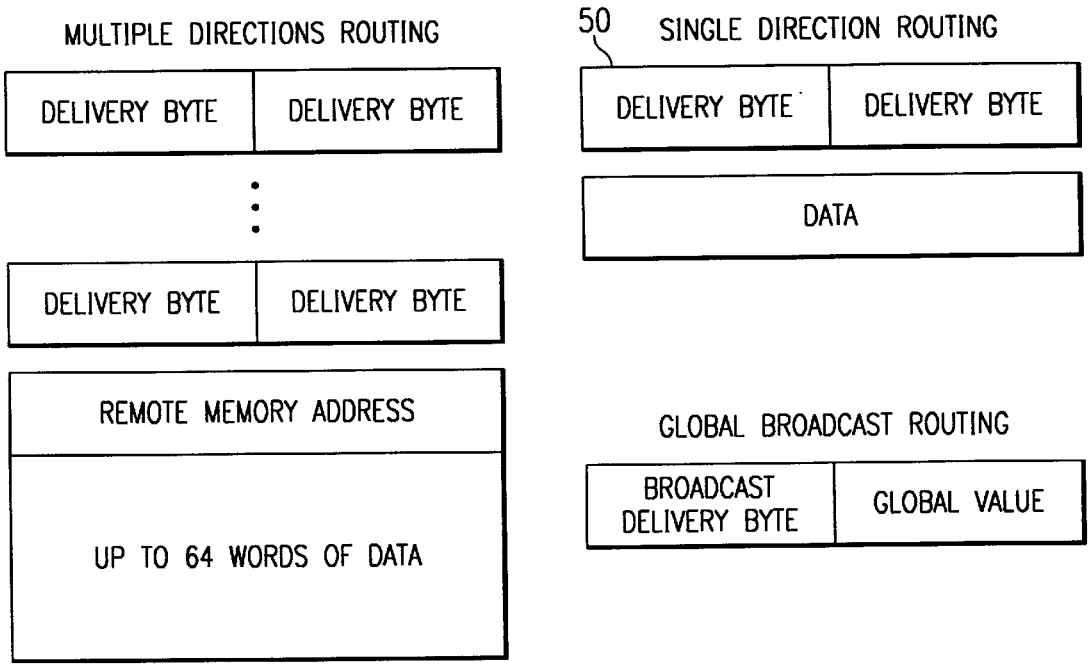
FIG. 8 illustrates a block diagram of network data structures for the field programmable gate array device.

In order to transfer information between processors 22 and between each virtual field programmable gate array device 20, a data transfer scheme is needed to read and write information from and to individual processors. The data transfer scheme cannot be limited to the number of processors per chip or the number of chips in a system, otherwise scalability is defeated. FIG. 8 shows an example of a network data structure for virtual field programmable gate array device 20. Virtual field programmable gate array device 20 is capable of transferring information through three types of routing structures - single direction routing, multiple direction routing, and global broadcast routing. Each routing structure type includes at least one delivery unit 50 that specifies a single routing vector, identifying the direction and distance the information is to travel. Single direction routing provides point to point information transfer between processors 22 of a virtual field programmable gate array device 20. Multiple vectors represented by multiple delivery units, as shown in the multiple directions routing structure type, define a specific routing path for information transfer between two virtual field programmable gate array devices 20. The global broadcast routing type identifies the information that is to be sent to two or more processors 22 within virtual field programmable gate array device 20. Delivery unit 50 is preferably an 8 bit wide data byte that determines the direction and distance of information transfer.

FIG. 9 is a block diagram of exemplary contents for delivery unit 50. The most significant bit of delivery unit 50 determines whether the information is to be delivered to the next network node, i.e. the next processor, or is to be loaded into the current processor. If the most significant bit of delivery unit 50 is at a logic one level, delivery unit 50 is a transfer delivery unit 51 and information is to be delivered to the next processor without interference by the current processor. Transfer delivery unit 51 includes four direction bits 52 that identify the direction in which the information is to be transferred and three direction bits 54 that identify the distance the information is to be transferred. The direction of information transfer may be to one of six three dimensional directions from the processor or may be a global broadcast to other processors within the network. Though shown and described as an 8 bit byte with specific direction and distance requirements, delivery unit 50 may be of any bit length and employ any scheme to delivery information to processors 22.

Besides transferring information to processors 22 in physical three dimensional orthogonal straight line paths, delivery units 50 may also be programmed to transfer information in abstract directions. Abstract directions are non-straight line paths that are viewed as straight line paths by virtual field programmable gate array device 20. Direction bits 52 can identify any abstract direction as programmed for the desired information transfer. Delivery unit 50, through abstract direction programming, bridge the gap between physically local neighbor connections and logically near-neighbor connections of processors 22. Additionally, programming of a global delivery unit can be performed for information transfer to all processors 22 or to a desired set of processors 22.

Once the direction has been established, transfer delivery unit 51 is used in transferring the information according to the distance prescribed by the distance bits 54 of transfer delivery unit 51. The value of the distance bits 54 within transfer delivery unit 51 is decremented for each transfer to a neighboring processor until the information has reached its desired destination. For the specific example shown, a maximum distance of 8 can be programmed into any open delivery unit 50. Once the direction and distance of transfer delivery unit 51 have been satisfied, transfer delivery unit 51 is cleared off to allow processing of the next delivery unit.

Once the information has reached its desired processor, transfer delivery unit 51 is cleared away and a node delivery unit 53 determines how the information is to be transferred within the processor. A logic zero value in the most significant bit of delivery unit 51 determines that the delivery unit is a node delivery unit 53 and the information is to be loaded to the current processor. The second most significant bit of node delivery unit 53 determines whether the information is to be transferred to the processor's memory or to the processor's CPU registers. If the information is to be transferred to the processor's memory, the remaining bits of node delivery unit 53 include the word count of information following node delivery unit 53 that is to be loaded into the processor's memory. If the information is to be delivered to the processor's CPU registers, two bits of node delivery unit 53 are used to select the appropriate register for delivery. The remaining bits are control signals for storing information into the selected register.

Figure 10:
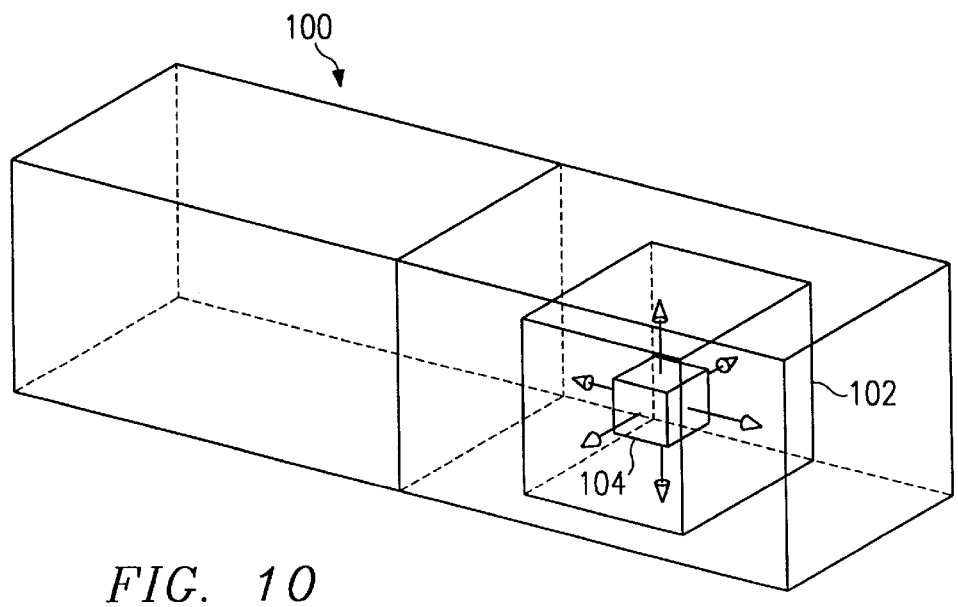
FIG. 10 illustrates a block diagram of a higher dimensional computing space.

The delivery unit scheme shown in the specific example of a virtual field programmable gate array device is a medium grain application of a general coarser grain concept of virtualizing a higher dimensional computer space, i.e. supporting more degrees of freedom than three dimensions. FIG. 10 shows an example of the structure of higher dimensional computer space 100. The higher dimensional computer space 100 virtualized into a three dimensional space rather than a one dimensional virtual memory space of conventional work station machines. Processors 102 controlled by a CPU 104, with a memory to logic ratio closer to ten to one in order provide improved memory bandwidth utilization for application domains, are placed within a mesh to virtualize the higher dimensional computer space into three physical dimensions and additional "hidden" dimensions that provide the degrees of freedom from the network structure of the processors. This approach provides a more physically, geometrically oriented view of the computing equipment. The hidden dimensions provide for the program space associated with the three dimensional data space, read/write control among processors, code segmentation and partitioning of data space, and overall administrative tasks. Each processor 102 manages a volume of the higher dimensional computer space through application emulation. Higher dimensional computer space 100 is designed to be scalable in three dimensions and operates regardless of the grain size of individual processors. Higher dimensional computer space 100 also operates as a paged system with three dimensional paging performed through the network.

Figure 11:
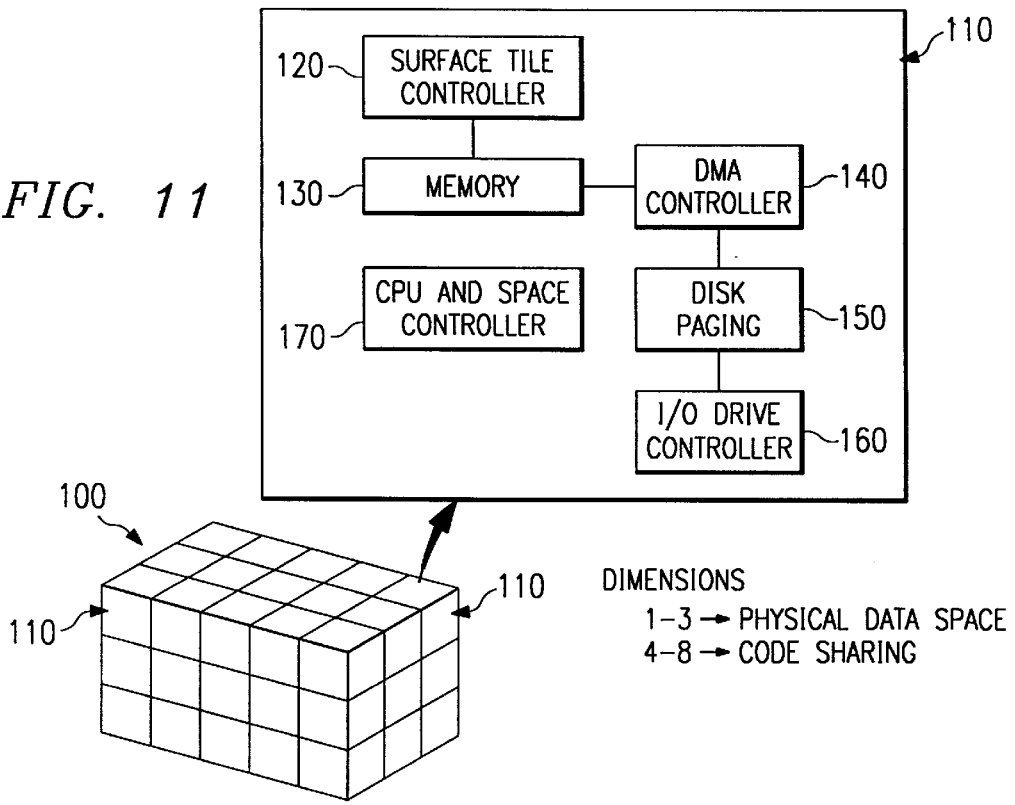
FIG. 11 illustrates a block diagram of a processor board managing a portion of the higher dimensional computing space.

FIG. 11 shows an example of a three dimensional volumetric computer physical representation of higher dimensional computer space 100. Higher dimensional computer space 100 includes a plurality of processor boards 110. Processor boards 110 are tiled together in a three dimensional network structure. Each processor board 110 represents a three dimensional page and manages a small volume of higher dimensional computer space 100. Each processor board 110 includes a surface tile controller 120, memory 130, a direct memory access controller 140, an input/output drive controller 160, disk paging space 150, and a space controller 176. Each processor board 110 virtualizes its volume of higher dimensional computer space 100 into eight dimensions. Three of the dimensions represent the physical space associated with the hardware and the remaining five dimensions are hidden and provide code sharing aspects to replace pointer processing. The primary activity occurs in the three physical dimensions which are kept active while the five hidden dimensions are virtualized since activity is less frequent in these hidden dimensions.

Figure 12:
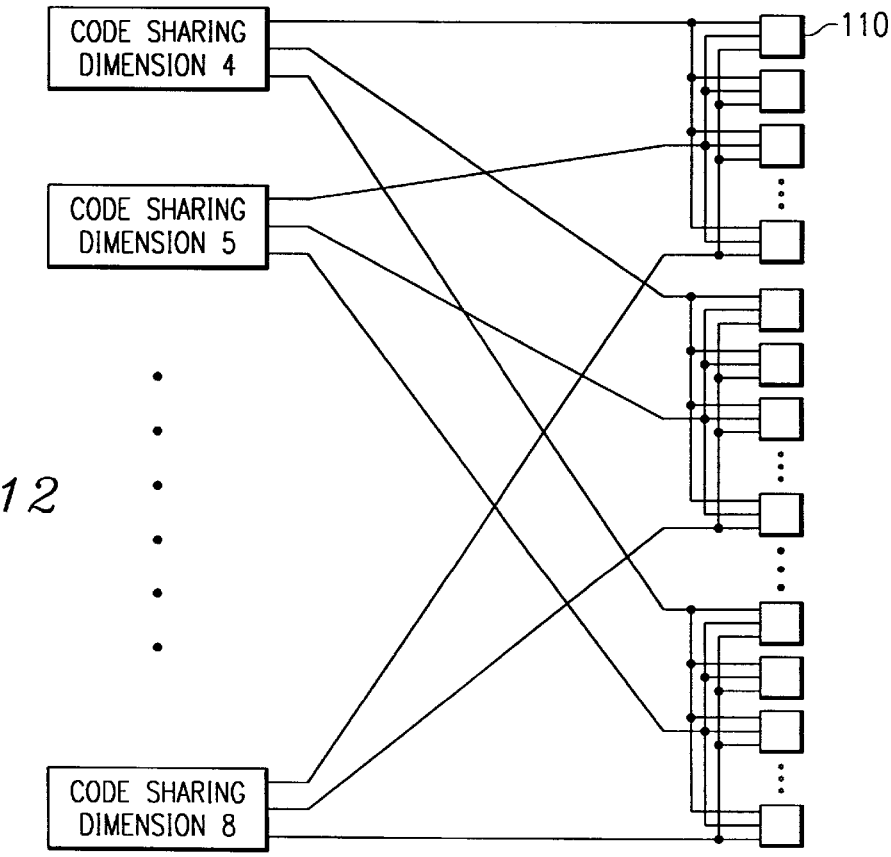
FIG. 12 illustrates code sharing communications to each processor board.

FIG. 12 shows how each processor board communicates to the code sharing dimensions of higher dimensional computer space 100. Each hidden dimension communicates through the network structure to processor boards 110 as an individual broadcast network node in order to provide code sharing capability. The communication aspects of the code sharing dimensions generally operates in a similar manner as a packet switched telecommunications system, with predetermined static connections being made. In this manner, each code sharing dimension can communicate to each and every processor board 110. The communication network of higher dimensional computer space 100 provides the backbone to implement a more specific device such as virtual field programmable gate array device 20.

The virtual field programmable gate array approach allows for the tradeoff of speed for silicon utilization by allowing the same silicon die area to represent four to eight times as many gates as a conventional field programmable gate array device. The use of small, fast processors provides for the ability to emulate an equivalent number of logic gates of a field programmable gate array device 20 in at most the same die area. The software approach used by the virtual field programmable gate array device 20 provides a flexible alternative, allowing speed, density, datapath operations, or power consumption to be emphasized in the software. Processor gates are serially reused and no layout or routing tools are needed to program an algorithm into virtual field programmable gate array device 20.

Virtual field programmable gate array device 20 may be used in a variety of applications including embedded image processing, miniature MPP applications, fixed point signal processing, RTL accelerator systems, custom computing accelerator boards, and high density virtual logic operations. These applications may include the use of powering down processors during inactivity to reduce power consumption with subsequent reactivation by the network. Delivery units may be used to reactivate those processors which have deactivated during periods of inactivity.

In summary, a virtual field programmable gate array device includes a plurality of processors programmed to emulate conventional field programmable gate array devices. Through emulation, the virtual field programmable gate array device can be manufactured in a comparatively smaller die size area than a conventional static random access memory based device with enhanced performance and operating speed. The reconfigurable nature of the virtual field programmable gate array device allows for the programming of other applications besides the emulation of field programmable gate array logic equations.

Thus, it is apparent that there has been provided, in accordance with the present invention, a virtual field programmable gate array device that satisfies the advantages set forth above. Although the preferred embodiment has been described in detail, it should be understood that various changes, substitutions, and alterations can be made herein. For example, though the virtual field programmable gate array device has been described as emulating the conventional field programmable gate array device, it should be understood that the virtual field programmable gate array device can be programmed to emulate other applications besides field programmable gate array logic equations. Other examples are readily ascertainable by one skilled in the art without departing from the spirit and scope of the present invention as defined by the following claims.

What is claimed is:

1. A virtual field programmable gate array device comprising:

a plurality of processors operable to communicate within a network array, each of said plurality of processors operable to emulate a plurality of logic gates of a plurality of field programmable gate arrays as an algorithms;

each of said plurality of processors including a network interface connected to a predetermined number of adjacent processors and operable to receive network information from and to send network information to said predetermined number of adjacent processors, said network interface of each of said plurality of processors transferring network information by a plurality of delivery units, each of said plurality of delivery units including a transfer delivery unit specifying a direction corresponding to one of said predetermined number of adjacent processors and a distance to a specific processor to which said network information is to be transferred within said network array.

2. The virtual field programmable gate array device of claim 1, wherein each of said plurality of processors includes:

a central processing unit operable to emulate said plurality of logic gates of said plurality of field programmable gate arrays in response to said network information; and a memory coupled to said network interface and said central processing unit, said memory operable to store and update said network information for emulating said plurality of logic gates of said plurality of field programmable gate arrays.

3. The virtual field programmable gate array device of claim 2, wherein each of said plurality of processors further includes:

an instruction cache coupled to said central processing unit and operable to store most recently used programming instructions of said network information stored in said memory;

a data cache coupled to said central processing unit and operable to store most recently used data of said network information stored in said memory, said central processing unit operable to access said instruction cache and said data cache without directly accessing said memory, said instruction and data caches having deterministic time behaviors for real time scheduling capability;

a network buffer coupled to said network interface and operable to provide network information to said memory, said instruction cache, and said data cache for processing by said central processing unit.

4. The virtual field programmable gate array device of claim 1, wherein each of said plurality of delivery units includes a node delivery unit, said node delivery unit specifying how information is to be loaded into said specific processor.

5. The virtual field programmable gate array device of claim 4, wherein:

each of said processors further includes a memory operable to store and update said network information for emulating said plurality of logic gates of said plurality of field programmable gate arrays; and wherein said network interface of each of said processors is responsive to said node delivery unit indicating a load to memory to load information into said memory of said specific processor.

6. The virtual field programmable gate array device of claim 4, wherein:

each of said processors further includes a central processing unit operable to emulate said plurality of logic gates of said plurality of field programmable gate arrays in response to said network information; and wherein said network interface of each of said processors is responsive to said node delivery unit indicating a load to central processing unit to load information into said central processing unit of said specific processor.

7. The virtual field programmable gate array device of claim 1, wherein said transfer delivery unit is operable to specify a one of six orthogonal three dimensional directions within said network array.

8. The virtual field programmable gate array device of claim 1, wherein said transfer delivery unit is operable to specify one of a plurality of programmable direction paths within said network array.

9. The virtual field programmable gate array device of claim 1, wherein said transfer delivery unit is operable to specify all processors within said network array.

10. A virtual field programmable gate array device, comprising:

a plurality of processors operable to communicate within a network array, each of said plurality of processors operable to emulate a plurality of logic gates of a plurality of field programmable gate arrays;

a plurality of transfer delivery units for transferring network information to each processor, said plurality of transfer delivery units including transfer delivery information specifying a direction and distance to a specific processor of which information is to be transferred to within said network array; wherein each processor is operable to deactivate during periods of inactivity, said transfer delivery unit being operable to reactivate each processor for subsequent operations.

11. The virtual field programmable gate array device of claim 1, wherein:

said network interface of each of said plurality of processors is further operable to decrement said distance of said transfer delivery unit of a received network information, determine if said decremented distance of said transfer delivery unit is zero, and transfer said received network information to one of said predetermined number of adjacent processors corresponding to said direction of said transfer delivery unit if said decremented distance of said transfer delivery unit is nonzero.

12. The virtual field programmable gate array device of claim 1, wherein:

said network interface of each of said plurality of processors is further operable to load said received network information into said processor if said decremented distance of said transfer delivery unit is zero.

13. The virtual field programmable gate array device of claim 11, wherein:

at least one of said network information includes a plurality of transfer delivery units;

said network interface of each of said plurality of processors is further operable to determine if a next unit following said transfer delivery unit is another transfer delivery unit if said decremented distance of said transfer delivery unit is zero, transfer said received network information to one of said predetermined number of adjacent processors corresponding to said direction of said next transfer delivery unit if said next unit following said transfer delivery unit is a following transfer delivery unit and said decremented distance of said transfer delivery unit is zero, and load said received network information into said processor load said received network information into said processor if said next unit following said transfer delivery unit is not a following transfer delivery unit and said decremented distance of said transfer delivery unit is zero.

\* \* \* \* \*